United States Patent [19]

Prusak

[11] Patent Number: 4,711,092
[45] Date of Patent: Dec. 8, 1987

[54] LIGHT SWITCH AND BRAKE LINE CONNECTOR ASSEMBLY

[75] Inventor: Allan E. Prusak, Washington, Wis.

[73] Assignee: Hayes Industrial Brake, Inc., Mequon, Wis.

[21] Appl. No.: 893,623

[22] Filed: Aug. 6, 1986

[51] Int. Cl.[4] .............................................. B60T 17/22
[52] U.S. Cl. ...................... 60/534; 285/190; 200/81 R
[58] Field of Search ................ 60/534; 200/81 R; 340/52 C; 285/190

[56] References Cited

U.S. PATENT DOCUMENTS 3,884,040  5/1975  Green ........................... 60/534 X
4,621,565  11/1986 Leigh-Monstevens ........... 60/534 X Primary Examiner—Harold W. Weakley
Attorney, Agent, or Firm—Ronald E. Barry

[57] ABSTRACT

A brake light switch and brake line connector assembly for a master cylinder, the assembly including a pressure actuated light switch having a threaded stem which is adapted to be connected to a threaded opening provided in the high pressure side of the master cylinder, the threaded stem including an inner passage and an annular groove around the outside connected to the passage by a port, and a Banjo connector assembly including a Banjo connector and a pair of soft metal washers, the Banjo connector being mounted on the annular groove in the threaded stem of the light switch and sealed thereon by the washers, to connect the master cylinder to the brake line.

8 Claims, 3 Drawing Figures

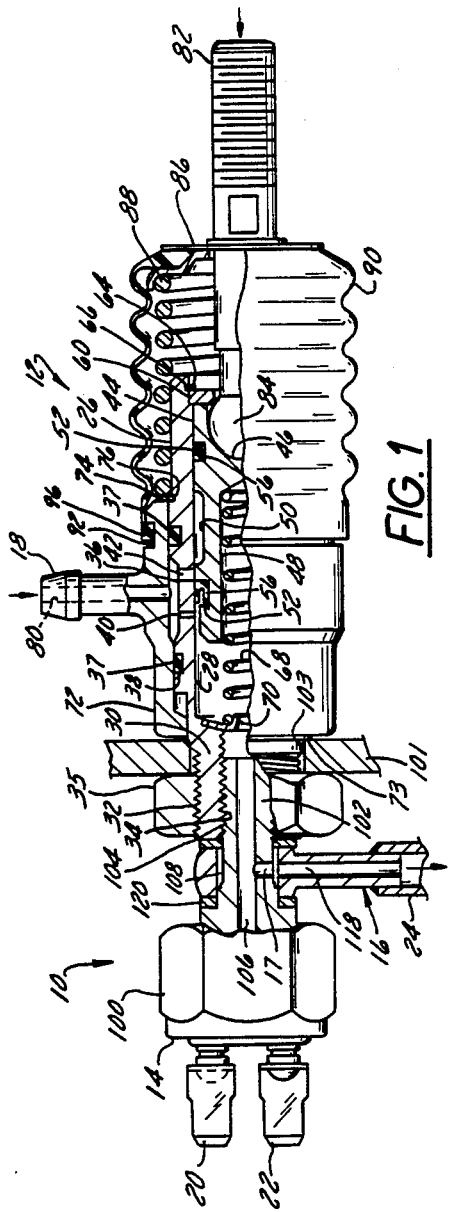

LIGHT SWITCH AND BRAKE LINE CONNECTOR ASSEMBLY

BACKGROUND OF THE INVENTION

The present invention is related to brake systems that are equipped with brake lights that are turned on in response to an increase in pressure in the master cylinder which is used to pressurize the brakes. The body of the master cylinder is tapped on the high pressure side of the piston and connected to the brake. A pressure responsive light switch is also connected through a threaded opening into the high pressure side of the master cylinder. Both of these connections are made separately to the master cylinder. This requires special machining of the master cylinder body, as well as a special adaptor for connecting the cartridge to the brake line.

SUMMARY OF THE INVENTION

The pressure actuated light switch and brake line connector device, according to the present invention, is adapted to be mounted on the threaded opening in the master cylinder to provide a single connection for both the brake light switch and the brake line. With this arrangement the brake light and brake line connector can be quickly and easily attached to the master cylinder. Machine operations are thereby simplified, resulting in both time and cost savings. The brake line connector includes a Banjo connector which can be mounted on the stem of the pressure actuated light switch at any angular position required for connection to the brake line. Soft metal washers are provided on the sides of the Banjo to form a self-sealing connection between the Banjo connector and light switch on mounting the assembly on the master cylinder.

IN THE DRAWINGS

FIG. 1 is a side elevation view of the light switch and brake line connector assembly shown mounted on the master cylinder.

FIG. 2 is a view similar to FIG. 1 showing the piston in the master cylinder in the operative position.

FIG. 3 is a perspective view of a Banjo connector partly broken away to show the fluid passages to the brake line.

DESCRIPTION OF THE INVENTION

The light switch-brake line connector device 10 according to the present invention is shown mounted on a master cylinder 12 and generally includes a pressure actuated light switch assembly 14 and a Banjo type connector assembly 16. The master cylinder is connected to a hydraulic fluid source (not shown) through a fluid inlet 18. The light switch assembly 14 is connected to an electric circuit for a brake light by means of contacts 20 and 22. The Banjo connector assembly 16 is connected to the brake line 24 for the brakes. On actuation of the master cylinder, the increase in pressure in the master cylinder is sensed by the light switch assembly 14 which closes the pressure actuated switch (not shown) to turn on the brake lights. At the same time the brakes are pressurized through the Banjo connector assembly 16.

The master cylinder described herein is for explanatory purposes only as the assembly is useable with most master cylinders presently available. The master cylinder 12, as seen in the drawings, includes a cartridge 26 machined from bar stock and having a bore 28 at one end and a mounting section 30 at the other end. The mounting section having a threaded section 32 on the outside and a threaded bore 34 connected to the bore 28. A shallow annular recess 36 is provided around the central portion of the cartridge with an annular groove 38 located on each side of the recess 36. O-ring seals 37 are provided in grooves 38. The recess 36 is connected to the bore 28 by means of a timing port 40 and a compensating port 42.

A piston 44 is positioned within the bore 28 and is provided with a curved seat 46 at the outer end and a bore 48 at the inner end. An annular recess 50 is provided in the outside surface of the piston 44 with a groove 52 on each side of the annular recess 50. Seals 56 are provided in the grooves 52. The piston is retained in the bore 28 by means of a ring 60 positioned against a shoulder 62 at the end of the bore 28 and a retaining ring 64 positioned in a groove 66 at the end of the bore 28. The piston is biased against the retaining ring 62 by means of a spring 68 provided in the bore 28 of the piston and seated against a spring retainer 70 located at the end of the bore 28.

The recess 36 is enclosed by means of a sleeve 72 which is positioned on the cartridge and bears against a retaining ring 74 mounted in a groove 76 in the cartridge. The O-ring seals 37 in the grooves 38 seal the sides of the the recess 36 to form a reservoir around the cartridge. Fluid is admitted to the recess 36 through a passage 80 provided on the inlet connection 18.

The piston 44 is actuated by means of an actuator 82 having a ball 84 at the inner end which is seated in the curved seat 46 in the piston 44. The actuator is supported on a ring 86 and biased by a spring 88 to a neutral position. The spring is enclosed in a dust boot 90 which has one end seated in a groove 92 in the sleeve 72 and is secured to the ring 86.

The master cylinder is mounted on a frame member 101 having a hole 103. The mounting section 30 is inserted in the hole 103 and a nut 35 is screwed onto the threaded section 32 until the frame member 101 is snug against a shoulder 73 on the cartridge 26.

The light switch assembly 14 combines a switch housing 100 with a Banjo bolt in the form of a stem 102, having a threaded section 104 on the end stem and with a fluid passage 106 provided in the stem 102 which communicates with a pressure transducer (not shown) provided inside the housing 100. An annular groove 108 is provided on the stem at the end of the threaded section 104 which is connected to the passage 106 by a transverse port 17.

The Banjo type connector assembly 16 includes a Banjo and a pair of soft metal washers 120. The Banjo 16 comprises a circular head 112 having a central aperture 114 and a hollow tubular stem 116 having a passage 118. The Banjo connector assembly 16 at any angular position deemed necessary for connecting the light switch to the brake line 24 can be mounted on the stem 102 of the light switch. The Banjo connector 16 is sealed on each side by means of the soft metal washers 120. The light switch assembly 14 is mounted on the master cylinder by turning the threaded section 104 into the threaded bore 34 until the washers 120 are firmly seated against the sides of the circular head 112.

In operation, the master cylinder is filled with hydraulic fluid which is allowed to flow through the passage 106, port 17 and passage 118 until the system is filled. On movement of the actuator 82 into the bore of the master cylinder 28 the hydraulic fluid will be moved by the piston 44 with a small amount of the fluid allowed to flow through the timing port into the recess 36 until the seal 58 passes over the timing port. The compensating port will then be opened allowing fluid to flow into the annular groove 50. As the fluid pressure builds up in the master cylinder, the light switch will be initially actuated to close the circuit to the brake lights. At the same time the fluid pressure in the Banjo connector 16 will increase to actuate the brakes.

What is claimed is:

1. The combination with a master cylinder having a threaded passage connected to the high pressure chamber on the master cylinder and a pressure actuated brake light switch and brake line connector assembly, said assembly comprising
    a housing having a tubular stem forming a passage to said housing, said stem having a threaded section at the end for mounting on the threaded passage of the master cylinder,
    an annular groove around said stem,
    a port in said stem connecting said groove to said passage in said stem,
    a shoulder at the inner end of the stem, and
    a Banjo type connector assembly mounted on the stem in abutting relation to such shoulder for connecting the groove to the brake line.

2. The assembly according to claim 1 wherein said Banjo assembly comprises
    a tubular member having a circular head and a pair of seal rings, said seal rings being mounted on each side of said head to form a seal between said head and the shoulder at the end of the stem and between the head and the master cylinder for forming a seal between said master cylinder and said head.

3. The assembly according to claim 2 wherein said seal rings are formed of soft metal.

4. A master cylinder brake light switch and brake line connector assembly comprising
    a pressure actuated switch assembly having a threaded stem adapted to be mounted in a master cylinder, said stem including an axial passage and a transverse port connected to said axial passage,
    and a brake line connector assembly including a Banjo connector having an opening for mounting on said stem and a hollow tubular stem having a central passage connected to the brake line.

5. The assembly according to claim 4 including an annular groove in said threaded stem connected to said port.

6. The assembly according to claim 5 wherein Banjo connector is mounted on said stem to enclose said annular groove.

7. A brake light switch and brake connector assembly for a master cylinder of the type having a threaded opening connected to the high pressure chamber of the master cylinder, said assembly comprising
    a pressure actuated light switch having a threaded stem adapted to be mounted in the threaded opening in the master cylinder, said stem including a fluid passage and a transverse port connected to said passage and a Banjo-type connector assembly mounted on said stem for connecting the passage in said stem to the brake line.

8. The assembly according to claim 7 wherein said Banjo connector assembly includes a Banjo connector having a circular head and a hollow tubular stem, said head having a central opening and an annular groove around the said threaded stem to provide fluid communication between said port and said tubular stem.

* * * * *